(12) United States Patent
Piazza et al.

(10) Patent No.: US 9,579,964 B2
(45) Date of Patent: *Feb. 28, 2017

(54) HYBRID POWERTRAIN UNIT FOR MOTOR VEHICLES WITH A BELT TRANSMISSION DEVICE BETWEEN ELECTRIC MACHINE AND DIFFERENTIAL

(71) Applicant: C.R.F. Societa Consortile per Azioni, Orbassano (Turin) (IT)

(72) Inventors: Andrea Piazza, Orbassano (IT); Marco Garabello, Orbassano (IT); Gianluigi Pregnolato, Orbassano (IT); Fabio Pesola, Orbassano (IT)

(73) Assignee: C.R.F. Società Consortile per Azioni, Orbassano, Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,448

(22) Filed: May 18, 2015

(65) Prior Publication Data
US 2015/0360554 A1    Dec. 17, 2015

(30) Foreign Application Priority Data

Jun. 17, 2014 (EP) ..................................... 14172677

(51) Int. Cl.
*B60K 6/48* (2007.10)
*B60K 6/445* (2007.10)
(Continued)

(52) U.S. Cl.
CPC ............... *B60K 6/445* (2013.01); *B60K 6/26* (2013.01); *B60K 6/365* (2013.01); *B60K 6/387* (2013.01);
(Continued)

(58) Field of Classification Search
None
See application file for complete search history.

(56) References Cited

U.S. PATENT DOCUMENTS

| 6,719,654 B2 * | 4/2004 | Deichl | ..................... B60K 6/40 180/65.25 |
| 2002/0065163 A1 | 5/2002 | Deichl | |
| 2010/0193268 A1 | 8/2010 | McGee | |

FOREIGN PATENT DOCUMENTS

| DE | 102011010085 | 8/2012 |
| EP | 2727757 | 5/2014 |

(Continued)

OTHER PUBLICATIONS

European Search Report for Application No. 14172677.8 mailed Dec. 1, 2014, 3 pages.

*Primary Examiner* — Erin D Bishop
(74) *Attorney, Agent, or Firm* — Remarck Law Group PLC

(57) ABSTRACT

A hybrid powertrain unit comprises an engine and a gearbox device with a primary shaft that can be connected to a shaft of the engine via a clutch. The gearbox device comprises a secondary shaft with an output pinion meshing with a first crown wheel of a differential, the casing of which is rigidly connected to a casing of the gearbox device. An electric machine of the unit is configured to function as electric motor and an electric generator, having a shaft connected by a transmission to a second crown wheel of the differential. In the transmission, which is arranged between the electric machine shaft and the second crown wheel is an engagement device that can be driven via an actuator. The electric machine shaft is connected to the engine shaft on a side opposite of the gearbox device. The transmission includes a gear-reduction jump constituted by a belt transmission.

12 Claims, 13 Drawing Sheets

(51) Int. Cl.
*B60K 6/365* (2007.10)
*B60K 6/547* (2007.10)
*B60K 6/387* (2007.10)
*B60K 6/26* (2007.10)
*B60K 6/40* (2007.10)
*F16H 37/10* (2006.01)
*B60K 6/52* (2007.10)
*B60K 25/00* (2006.01)
*B60K 25/02* (2006.01)

(52) U.S. Cl.
CPC .................. B60K 6/40 (2013.01); B60K 6/48 (2013.01); B60K 6/547 (2013.01); B60K 6/52 (2013.01); *B60K 2006/4841* (2013.01); *B60K 2025/005* (2013.01); *B60K 2025/022* (2013.01); *F16H 2037/101* (2013.01); *Y02T 10/6221* (2013.01); *Y02T 10/6265* (2013.01); *Y10S 903/906* (2013.01); *Y10S 903/91* (2013.01); *Y10S 903/914* (2013.01); *Y10S 903/919* (2013.01)

(56) References Cited

FOREIGN PATENT DOCUMENTS

| | | |
|---|---|---|
| WO | 2005095141 | 10/2005 |
| WO | 2013007886 | 1/2013 |

* cited by examiner

HYBRID POWERTRAIN UNIT FOR MOTOR VEHICLES WITH A BELT TRANSMISSION DEVICE BETWEEN ELECTRIC MACHINE AND DIFFERENTIAL

CROSS REFERENCE TO RELATED APPLICATIONS

This application claims priority to European Patent Application No. 14172677.8 filed on Jun. 17, 2014, the entire disclosure of which is incorporated herein by reference.

FIELD OF THE DESCRIPTION

The present invention relates to a hybrid powertrain unit for motor vehicles, of the type comprising:
an internal-combustion engine; and
a gearbox device including:
at least one primary shaft that can be connected to the crankshaft of the motor vehicle by means of a clutch device;
at least one secondary shaft, the axis of which is parallel and arranged at a distance from the axis of said primary shaft, and which carries an output pinion;
a plurality of pairs of gears corresponding to a plurality of forward gear ratios, in which the gears of each pair are rigidly connected in rotation with respect to one between said primary shaft and said secondary shaft, and the other is freely rotatable with respect to the other of said primary and secondary shafts; and
a plurality of gear-selection devices for coupling in rotation each of said freely rotatable gears with the shaft on which it is mounted,
said unit further comprising:
a differential, having a first crown wheel meshing with said output pinion of said secondary shaft of the gearbox device; and
an electric machine adapted to operate both as electric motor and as electric generator, and having a casing rigidly connected to a supporting structure of said powertrain unit, and a shaft connected by means of a transmission to a second crown wheel of said differential.

A hybrid powertrain unit of the type referred to above is known, for example, from EP 1 868 832 B1. DE 10 2009 0566366 A1 and US 2002/065163 A1 also disclose a hybrid powertrain unit of the type referred to above, which also comprises an engagement device arranged, in the connecting transmission, between the shaft of the electric machine and the aforesaid second crown wheel of the differential, and means for actuating the aforesaid engagement device.

It should likewise be noted that in European patent application EP 13153802 (already filed, but not yet published at the date of priority of the present invention), the present applicant has proposed a powertrain unit of the type referred to above, with the engagement device arranged between the shaft of the electric machine and the second crown wheel of the differential, wherein moreover the electric machine has a shaft connected to the shaft of the internal-combustion engine at the end of the latter opposite to the end connected to the gearbox device.

SUMMARY OF THE INVENTION

The object of the present invention is to provide a hybrid powertrain unit that will have a simple structure and small overall dimensions and that will be efficient, reliable, and versatile in operation.

With a view to achieving the above purpose, the subject of the invention is a hybrid powertrain unit of the type specified above, with the engagement device arranged between the shaft of the electric machine and the second crown wheel of the differential, the unit being further characterized in that:
the electric machine (M) has a shaft (16) connected to the shaft (5) of the internal-combustion engine (E) at the end of the latter opposite to the end connected to the gearbox device (C); and
said transmission that connects the shaft (16) of the electric machine (M) to said second crown wheel (19) of the differential (D) includes at least one gear-reduction jump constituted by a belt transmission.

Direct connection between the shaft of the internal-combustion engine and the shaft of the electric machine makes it possible to provide, for example, a function of the electric machine as BAS (Belt Alternator Starter), i.e., as a generator driven by the engine or as electric motor for starting the internal-combustion engine.

Provision of the transmission between the electric machine and the differential with at least one gear-reduction jump constituted by a belt transmission enables a high flexibility in the positioning of the electric machine, this representing a considerable advantage above all in small-sized motor vehicles.

In a preferred embodiment, the engagement device between the electric machine and the differential is a clutch engagement device, and the actuator means associated thereto comprise an electromagnetic or electrohydraulic actuator and an electronic unit for controlling the actuator.

Activation of the engagement device is controlled by the electronic control unit of the motor vehicle according to a pre-arranged program, as a function of the operating parameters of the engine and of the motor vehicle. The same applies to the engagement device of the belt connection between the electric machine and the shaft of the internal-combustion engine, in the embodiment where this is envisaged.

Thanks to the aforesaid characteristics, the powertrain unit according to the invention may advantageously be used in front-wheel-drive motor vehicles, even of small dimensions. Use of the engagement device in the connection between the differential and the electric machine enables said connection to be made in the operating conditions in which this is desired, to the advantage of efficiency of the system.

Preferably, the aforesaid connection of the shaft of the electric machine to the engine shaft, on the side opposite to the gearbox device, is provided by means of an auxiliary belt transmission including an endless belt engaged on a first pulley connected to the shaft of the electric machine and on a second pulley connected to the shaft of the internal-combustion engine. Once again preferably, arranged between one of the aforesaid first and second pulleys of the auxiliary belt transmission and the respective shaft is a further engagement device.

In a variant for application to vehicles with four-wheel drive, the above transmission that connects the shaft of the electric machine to the aforesaid second crown wheel of the differential includes a gear for driving a transmission shaft connected to a further axle of the vehicle. The gear for driving the transmission shaft connected to the further axle of the vehicle may be arranged, for example, between the second crown wheel of the differential and the engagement device, or else alternatively between the engagement device and the shaft of the electric machine. In the former case, the torque of the electric machine is shared between the front axle and the rear axle in a way identical to what occurs for the torque of the internal-combustion engine, whereas in the latter case the functions of the electric machine are irrespective of the distribution of the torque of the internal-combustion engine and may even envisage that 100% of the torque of the internal-combustion engine is transmitted to the front axle of the motor vehicle and 100% of the torque of the electric machine is transmitted to the rear axle.

In yet another a variant, the above auxiliary belt transmission that connects the shaft of the electric machine to the shaft of the internal-combustion engine on the side opposite to the gearbox device also controls one or more auxiliary devices of the motor vehicle, such as, for example, the compressor of the air-conditioning system of the vehicle and a source of negative pressure for the braking system.

BRIEF DESCRIPTION OF THE FIGURES

Further characteristics and advantages of the invention will emerge from the ensuing description with reference to the annexed drawings, which are provided purely by way of non-limiting example and in which.

DETAILED DESCRIPTION OF THE INVENTION

Figure 1:
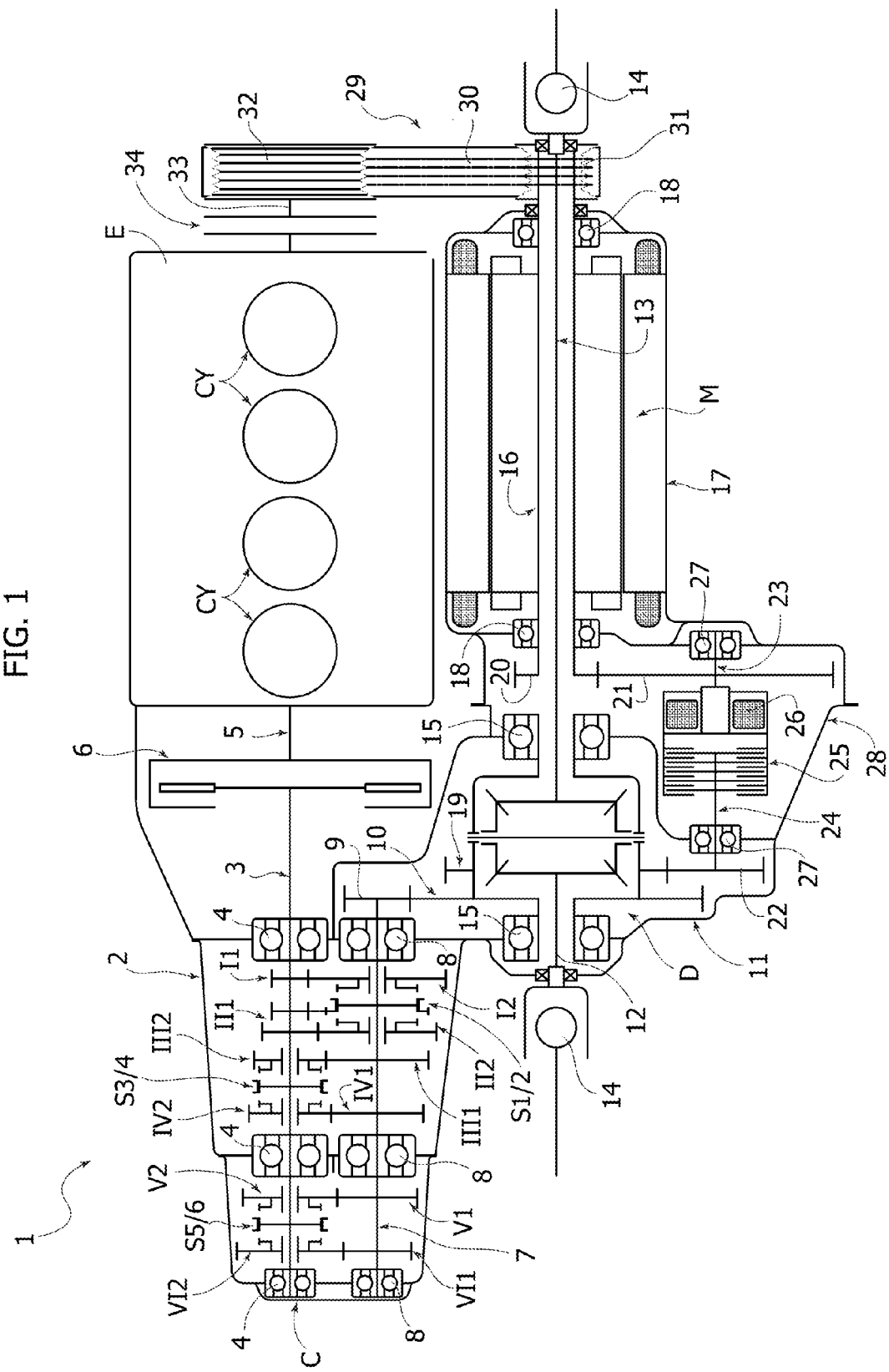
FIG. 1 is a schematic view of a first embodiment of a powertrain unit that has been already proposed by the present applicant in European patent application No. EP 13153802 (already filed, but not yet published at the date of priority of the present invention)

In FIGS. 1-13, parts in common are designated by the same reference numbers. In said figures, number 1 designates as a whole a hybrid powertrain unit for motor vehicles, comprising an internal-combustion engine E, a gearbox device C, a differential D, and an electric machine M.

According to the conventional art, the gearbox device C has a casing 2, rotatably mounted inside which is a primary shaft 3 by means of rolling bearings 4. The primary shaft can be connected to the shaft 5 of the engine E via a clutch device 6 of any known type. Moreover, rotatably mounted inside the casing 2 of the gearbox C, via rolling bearings 8, is a secondary shaft 7. The axis of the secondary shaft 7 is parallel to and arranged at a distance from the axis of the primary shaft 3.

Of course, even though the annexed drawings show a gearbox of the conventional type, which includes a single primary shaft and a single secondary shaft, the invention applies to any other known configuration of the gearbox device, including, in particular, the configurations that envisage two coaxial primary shafts that can be connected selectively to the crankshaft by means of a double-clutch device and have any number of secondary shafts.

To return to the configuration illustrated in the drawings by way of example, the primary shaft 3 and the secondary shaft 7 carry pairs of gears meshing together to provide a plurality of forward gear ratios. One gear of each pair is rigidly connected to the shaft by which it is carried, whereas the other gear of each pair is mounted freely rotatable on the respective shaft.

In the case of the example illustrated, the first gear ratio is obtained by a pair of gears including a gear I1 rigidly connected to the primary shaft 3 and a gear I2 mounted freely rotatable on the secondary shaft 7. The second gear ratio is obtained by means of a gear II1 rigidly connected to the primary shaft 3 and a gear II2 mounted freely rotatable on the secondary shaft 7. The third, fourth, fifth, and sixth gear ratios are obtained by means of pairs of gears including gears III1, IV1, V1, VI1 rigidly connected to the secondary shaft 7 and corresponding gears III2, IV2, V2 and VI2 mounted freely rotatable on the primary shaft 3.

Once again according to the known art, the primary and secondary shafts 3, 7 carry selection devices S1/2, S3/4 and S5/6 for connecting selectively in rotation each of the freely rotatable gears I2, II2, III2, IV2, V2, VI2 to the respective shafts on which they are carried.

The gearbox device C further comprises a third shaft (not visible in the plate of drawings), which carries in a freely rotatable way a reverse gear and a selection device for connecting said gear in rotation to the respective shaft in such a way as to transmit the motion of rotation of the primary shaft 3 to the secondary shaft 7 with a reversal of the direction of rotation.

The secondary shaft 7 carries an output pinion 9 meshing with a first crown wheel 10 of the differential D. The differential D, which has a structure of a type in itself known, has a casing 11 rigidly connected to the casing 2 of the gearbox device C and has two output shafts 12, 13 for transmitting the motion to the gears of the motor vehicle via constant-velocity universal joints 14. The crown wheel 10 is rigidly connected to the gear-train carrier of the differential, which is rotatably mounted within the casing 11 by means of bearings 15.

The electric machine M is adapted to function both as electric motor and as electric generator, according to the operating conditions. In the embodiment illustrated in FIG. 1, the electric machine M shares the axes of the two output shafts 12, 13 of the differential D and is axially traversed by its shaft, designated by 16. The shaft 16 is hollow and is in turn axially traversed by the output shaft 13 of the differential D so as to enable aligned arrangement of the electric machine M with the differential D. The casing 17 of the electric machine M is rigidly connected to the casing 11 of the differential D and possibly also to the structure of the internal-combustion engine E. The shaft 16 of the electric machine M is rotatably supported within the casing 17 via rolling bearings 18.

The shaft 16 of the electric machine M is connected in rotation to a second crown wheel 19 of the differential D rigidly connected to the gear-train carrier of the differential. In the case of FIG. 1, the connection between the shaft 16 of the electric machine M and the crown wheel 19 of the differential D is obtained by a double gear-reduction jump, obtained by means of a first pair of gears 20, 21 and a second pair of gears 22, 19. The gear 20 is rigidly connected to the shaft 16 of the electric machine M, whereas the gears 21, 22 are carried by two shafts 23, 24 aligned with one another, which can be connected by means of an engagement device 25, which, in the case of the example illustrated, is a clutch device controlled by an electromagnetic actuator 26, which is in turn driven by an electronic control unit U (illustrated schematically only in FIG. 1). The actuator could also be of an electrohydraulic type, or of any other known type. Also the engagement device could be of any other known type. The two shafts 23, 24 are rotatably mounted via rolling bearings 27 within a casing 28 of the gear-reduction transmission, which is rigidly connected to the casing 11 of the differential D and with the casing 17 of the electric machine M.

With reference to the specific example illustrated, the engagement device 25 and the electromagnetic actuator 26 may be obtained in any known way. For these reasons, the constructional details of said elements are not illustrated herein, also in order to render the drawings simpler and of easier to understand.

Finally, designated as a whole by CY are the cylinders of the engine that are arranged vertically in the condition where the unit is mounted on the motor vehicle. Consequently, the views illustrated in FIGS. 1-4 are top plan views, with reference to the arrangement where the powertrain unit is mounted in the motor vehicle. Typically, the unit is mounted in the front part of the motor vehicle, in association with the front wheels of the motor vehicle.

The electric machine M functions as electric motor or as generator, according to the operating conditions of the engine and of the motor vehicle. In particular, the following different operating modes are possible:
  electric drive (internal-combustion engine E turned off and gearbox in neutral);
  hybrid drive (internal-combustion engine turned on and gearbox with a gear engaged); and
  recovery of energy during braking (internal-combustion engine turned on and gear in neutral or else clutch 6 between the internal-combustion engine and gearbox disengaged).

The electric machine M may moreover be used as electric motor for filling the gap in the torque supplied by the internal-combustion engine to the wheels of the vehicle during gear change.

Finally, the engagement device 25 enables decoupling of the electric machine M in the operating conditions in which intervention thereof is not required.

As already mentioned, FIG. 1 of the annexed drawings regards a solution already proposed by the present applicant in the European patent application No. EP 13153802 (already filed, but not yet published at the date of priority of the present invention). In this solution, there is provided a direct connection of the shaft 16 of the electric machine M to the shaft 5 of the internal-combustion engine E, at the end of the engine E opposite to the one connected to the gearbox device C. For this purpose, in the example illustrated, an auxiliary belt transmission 29 is provided, including an endless belt 30 engaged on a first pulley 31 carried by the shaft 16 of the electric machine M and on a second pulley 32 carried by the shaft 33 that can be connected to the shaft 5 of the internal-combustion engine via an engagement device 34, for example, an electromagnetically governed one or one of any other known type. An engagement device of this type is, for example, described and illustrated in the document No. EP 1 529 957 A1 filed in the name of the present applicant.

The belt transmission 29 and the engagement device 34 enable direct connection of the shaft of the internal-combustion engine to the shaft of the electric machine M to provide, for example, a function of the electric machine as BAS (Belt Alternator Starter), i.e., as a generator driven by the engine or as electric motor for starting the internal-combustion engine.

In the modality of starting of the internal-combustion engine, the engagement device 25 is disengaged and the engagement device 34 is engaged.

In the modality of generation of current with the vehicle standing still, the internal-combustion engine is turned on, the engagement device 25 is disengaged, and the engagement device 34 is engaged.

In vehicles equipped with a stop-and-go device, in which the internal-combustion engine turns off automatically when the vehicle is stationary, the electric machine M makes it possible to keep auxiliary devices governed by the belt 30 functioning (such as the compressor of the air-conditioning system). In this condition, the engagement device 34 is disengaged.

Figure 2:
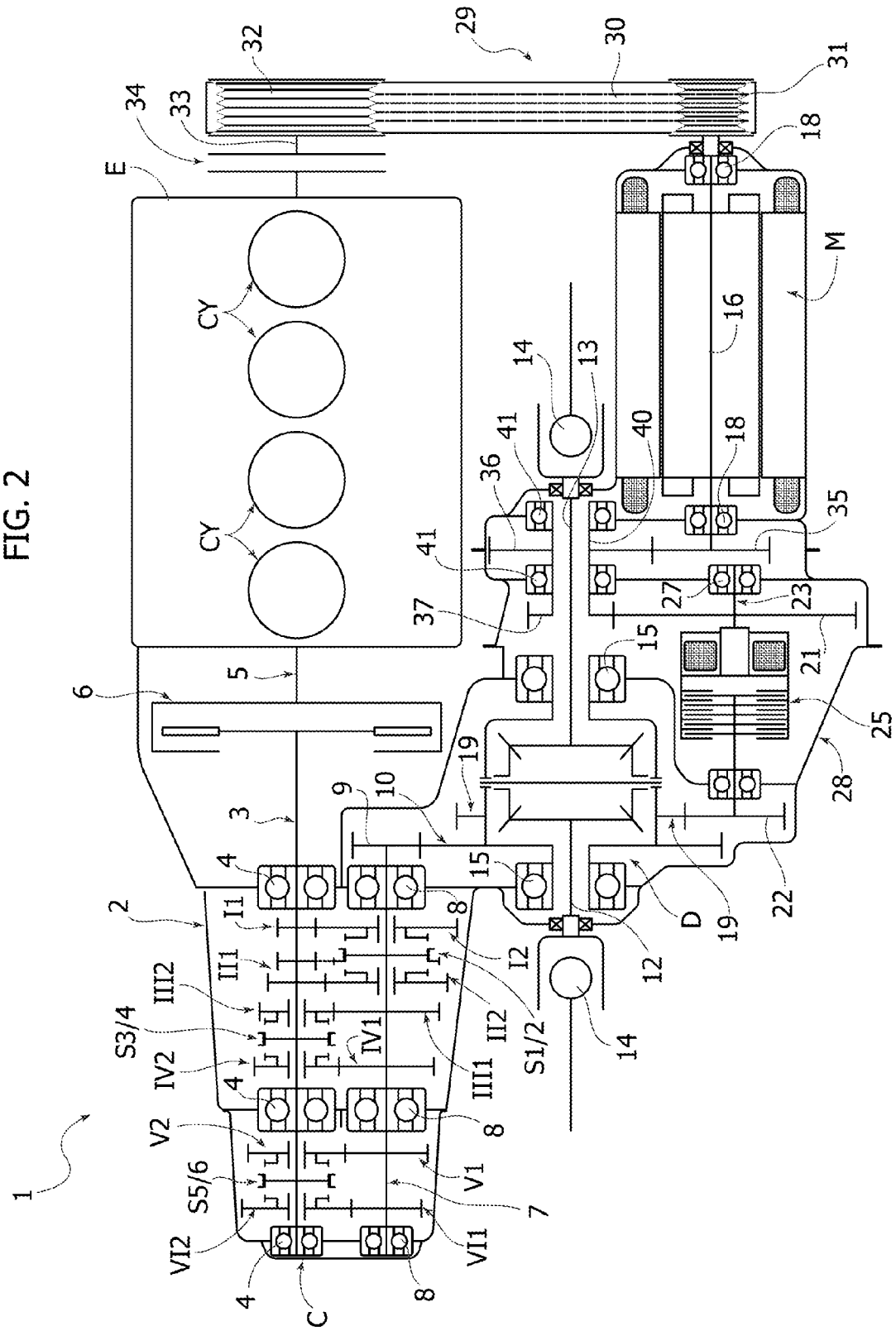
FIG. 2 is a schematic view of a variant of the powertrain unit of FIG. 1, likewise already proposed by the present applicant in European patent application No. EP 13153802.
Figure 3:
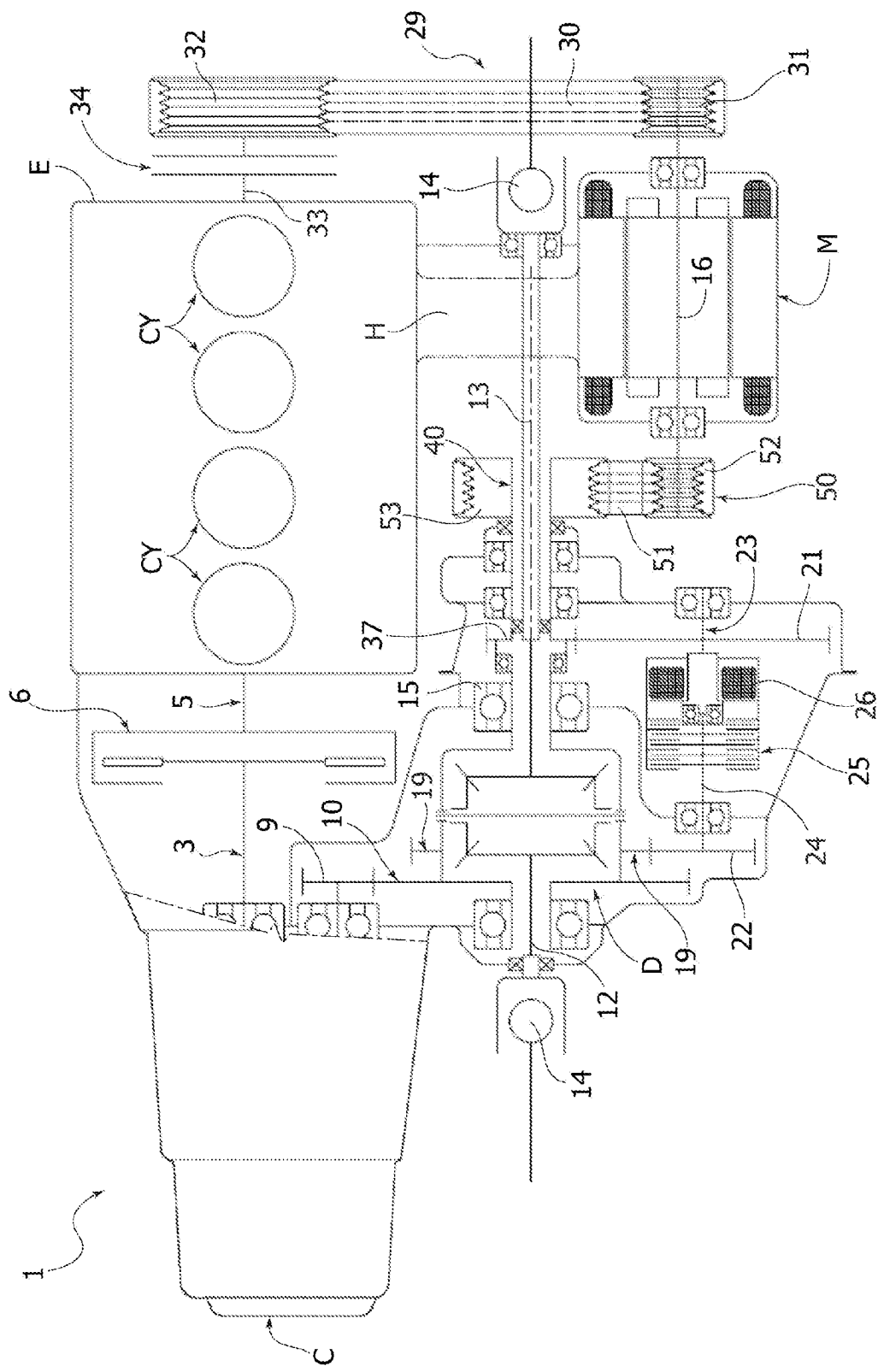
FIG. 3 is a schematic view of an embodiment of the powertrain unit according to the invention.

FIG. 2 illustrates a variant, which has also already been proposed in the prior European patent application No. EP 13153802, that differs from the first embodiment of FIG. 1 in that the electric machine M has its axis arranged parallel to and at a distance from the axes of the output shafts 12, 13 of the differential D. In this case, the connection between the shaft 16 of the electric machine M and the second crown wheel 19 of the differential D is obtained by means of three gear-reduction jumps. A first jump is obtained by means of the pair of gears 35, 36. A second jump is obtained by means of the pair of gears 37, 21, and a third jump is obtained by means of the pair of gears 22, 19. The gears 36, 37 are carried by a hollow shaft 40 that is mounted freely rotatable within the casing 28 via rolling bearings 41. The hollow shaft 40 is traversed by the output shaft 13 of the differential D. In the embodiment of FIG. 3, the gears 21, 22 are arranged as described with reference to FIG. 1, in association with shafts 23, 24 that can be connected together by means of the electromagnetically governed engagement device 25.

FIG. 3 illustrates a first embodiment of the invention. This solution has in common with the solutions of FIG. 3 both provision of an engagement device 25 between the electric machine M and the differential D and provision of a connection, for example obtained by means of the belt transmission 29, between the shaft of the electric machine M and the shaft 5 of the internal-combustion engine E, on the side opposite to the gearbox device.

The main difference with respect to the solutions of FIGS. 1 and 2 lies in the fact that, in the case of FIG. 3, the transmission that connects the shaft 16 of the electric machine M with the crown wheel 19 of the differential D includes a gear-reduction jump constituted by a belt transmission 50. In the example illustrated, the belt transmission 50 constitutes a first gear-reduction jump. It comprises a belt 51 engaged on a pulley 52 connected to the shaft 16 of the electric machine M. The belt 51 is moreover engaged on a pulley 53 connected on the hollow shaft 40 already described with reference to FIG. 2. Downstream of the belt transmission 50, the transmission remains identical to that of FIG. 2, with the two pairs of gears 37, 21 and 22, 19, with the gears 21 and 22 arranged coaxially and connected by the engagement device 25.

Provision of the transmission between the electric machine and the differential with at least one gear-reduction jump constituted by a belt transmission enables a high flexibility in the positioning of the electric machine, this representing a considerable advantage above all in small-sized motor vehicles.

Of course, the configuration and arrangement of the belt transmission may even differ from what is illustrated by way of example in FIG. 3. For example, the total number of gear-reduction jumps could be other than three, and the belt transmission 50 could be used for a gear-reduction jump subsequent to the first one. In theory, it would also be possible to provide the electric machine aligned with the differential, as in the solution of FIG. 1, and use the belt transmission 50 for connecting the shaft of the electric machine with a parallel shaft arranged at a distance apart, which is in turn connected to a gear meshing with the crown wheel 19 of the differential.

It should moreover be noted that a further difference as compared to FIG. 2 lies in the fact that in FIG. 3 the electric machine M is supported, in an off-axis position with respect to differential D, directly by the structure of the internal-combustion engine E, via a supporting structure H of any type, which is illustrated schematically in the drawing.

Figure 4:
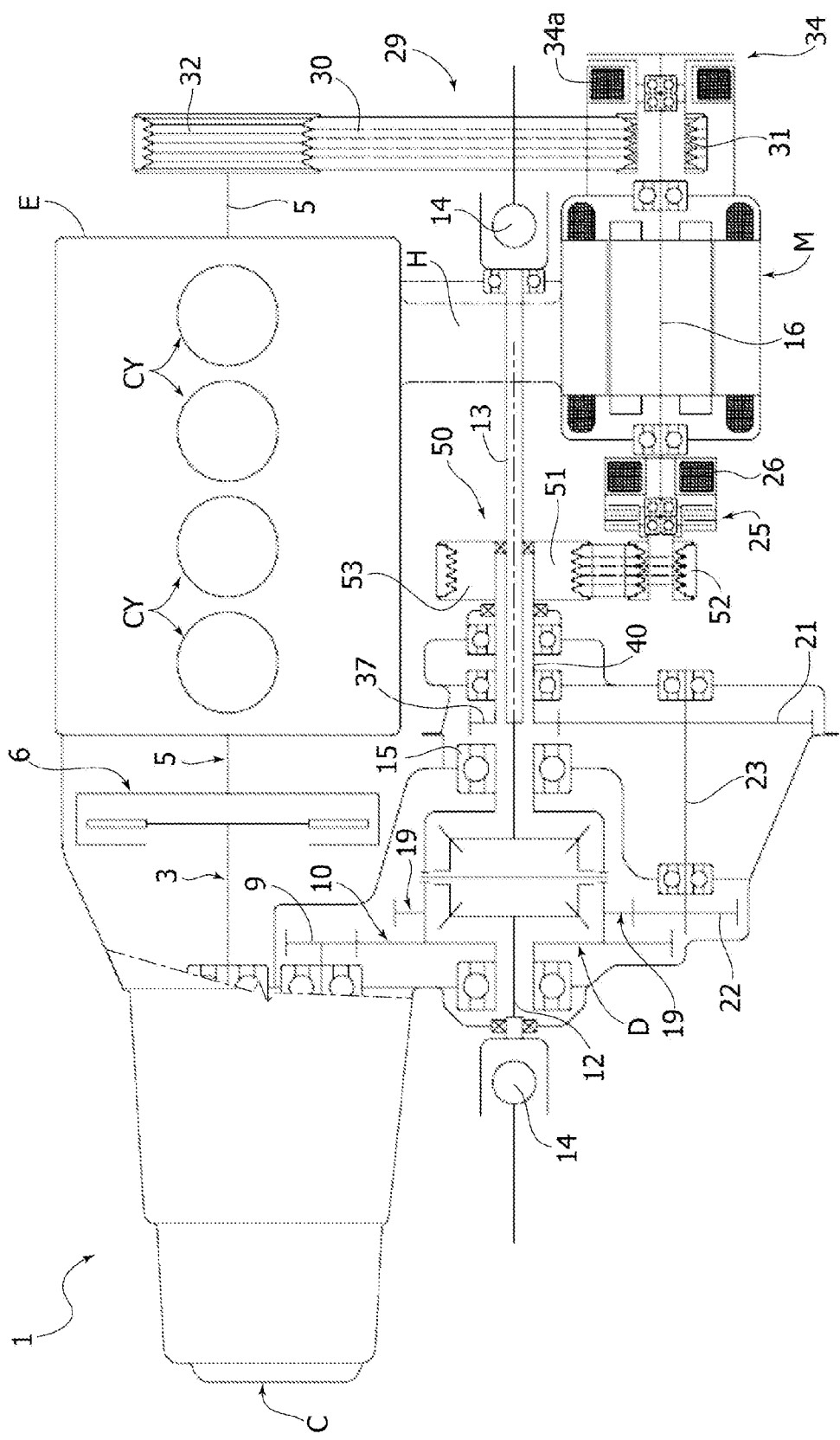
FIGS. 4 and 5 are schematic views that illustrate two further embodiments of the present invention.

FIG. 4 illustrates a second embodiment of the invention that differs from that of FIG. 3 in that, in this case, the gears 21, 22 are directly connected together, being both rigidly connected to a common shaft 23, whilst the engagement device 25, with the associated electromagnetic actuator 26, is arranged between the shaft 16 of the electric machine M and the pulley 52 of the belt transmission 50.

Once again in the case of FIG. 4, the engagement device 34 is not arranged between the shaft 5 of the internal-combustion engine and the pulley 32 of the belt transmission 29. In this case, the engagement device 34, provided with an electromagnetic actuator 34*a*, is arranged between the shaft of the electric machine M and the pulley 31 of the belt transmission 29. Consequently, in the embodiment of FIG. 4, the two engagement devices 25 and 34 are both associated to the shaft 16 of the electric machine M, at the opposite ends thereof.

Figure 5:
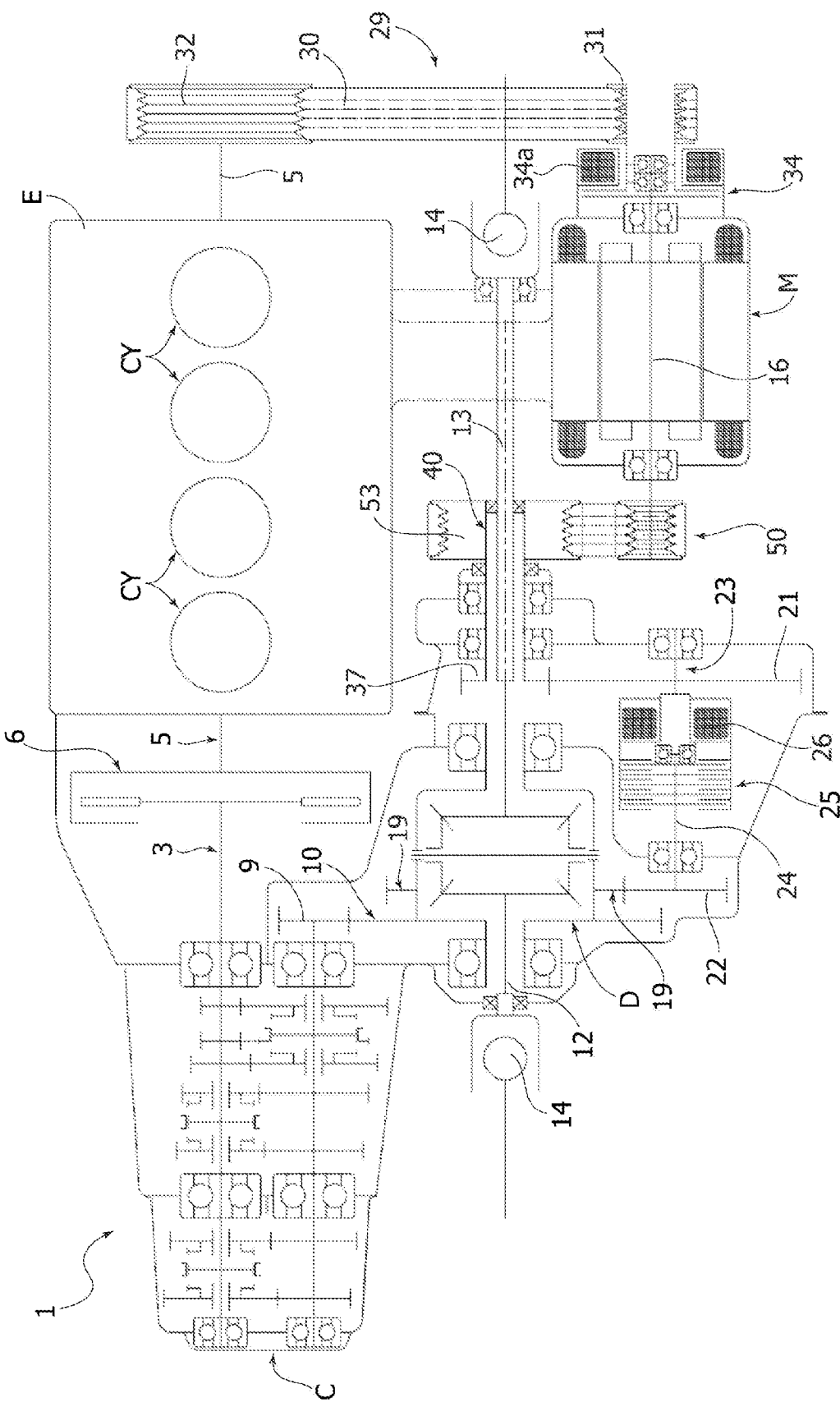

FIG. 5 shows a further embodiment that has the engagement device 25 arranged between the gears 21 and 22, as in FIG. 3, and the engagement device 34 that is arranged between the shaft 16 of the electric machine M and the pulley 31, as in FIG. 4 (in this case, however, the ensemble of the engagement device 34 and the actuator 34*a* is arranged axially between the pulley 31 and the electric machine M, whereas in FIG. 4 it is axially on the outside with respect to the pulley 31).

It would, of course, be possible to envisage that the engagement device 25 is arranged as in FIG. 4, i.e., between the pulley 52 and the shaft 16 of the electric machine M, and that the engagement device 34 is arranged as in FIG. 3, i.e., between the shaft 5 of the internal-combustion engine and the pulley 32.

Figure 6:
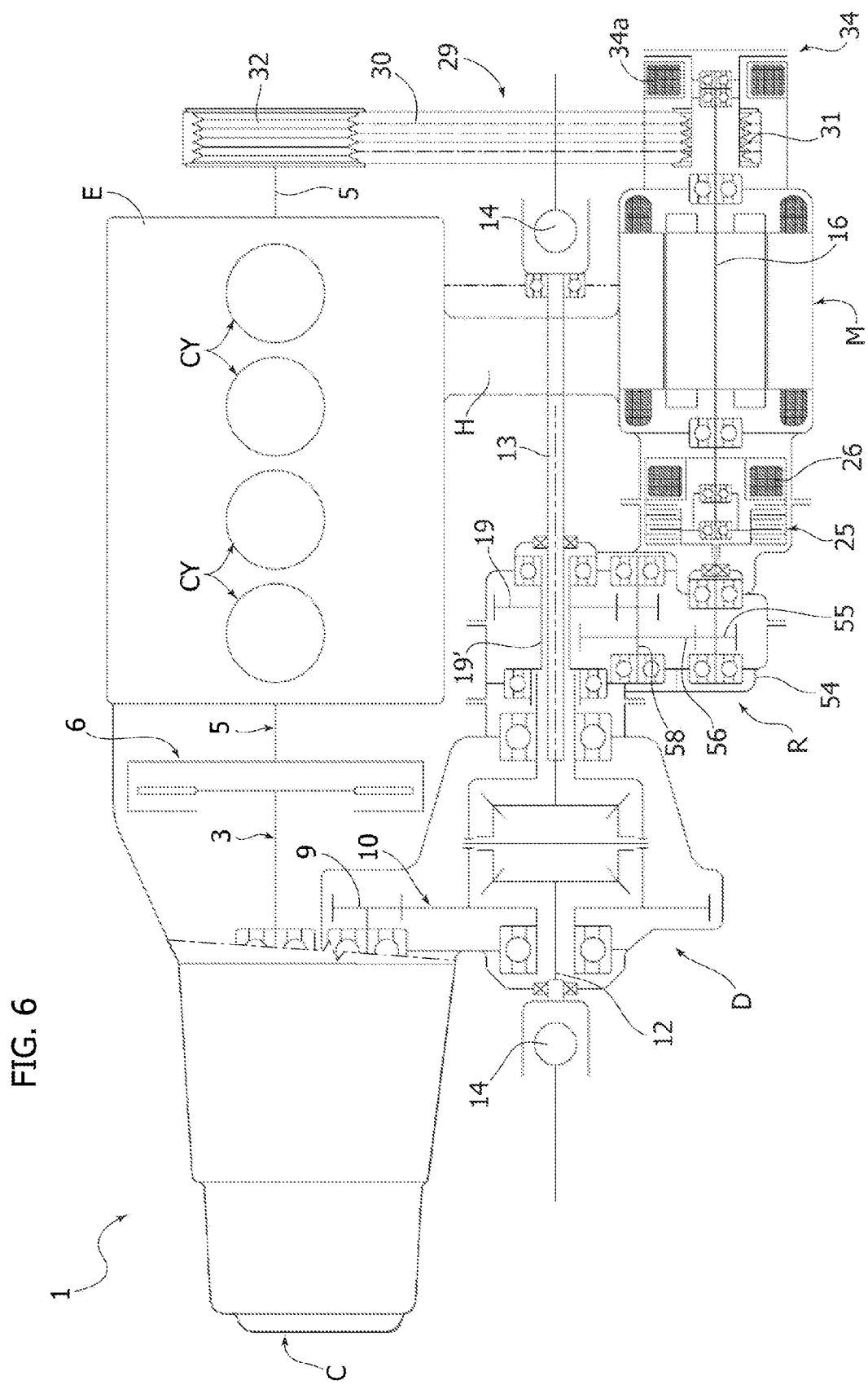
FIGS. 6-13 illustrate further embodiments that do not form part of the present invention, but that include characteristics that can also be adopted in the powertrain unit according to the invention, according to what will be illustrated in detail in what follows.

FIG. 6 illustrates a variant that does not form part of the present invention, in so far as it is without the belt transmission 50. In this variant, the two engagement devices 25 and 34 are associated to the opposite ends of the shaft 16 of the electric machine, as in the case of FIG. 4. In this case, the transmission between the shaft 16 of the electric machine M and the differential D comprises a reducer R having a casing 54 rigidly connected to the casing of the differential D and adapted to provide two gear-reduction jumps. The first jump is provided by means of a gear 55 connected to a shaft, which is in turn directly connected to the shaft 16 of the electric machine M, on the prolongation thereof. The gear 55 meshes with a gear 56 of a shaft 58, which is parallel to the shaft 13 of the differential and to the shaft 16 of the electric machine and is arranged in an intermediate position between them. Also connected on the shaft 58 is a gear 57 that meshes with the second crown wheel 19 of the differential D, which in this case is carried by a gear connected to a hollow shaft 19', which is in turn connected to the gear-train carrier of the differential and is arranged coaxially with respect to the shaft 13 of the differential.

Figure 7:
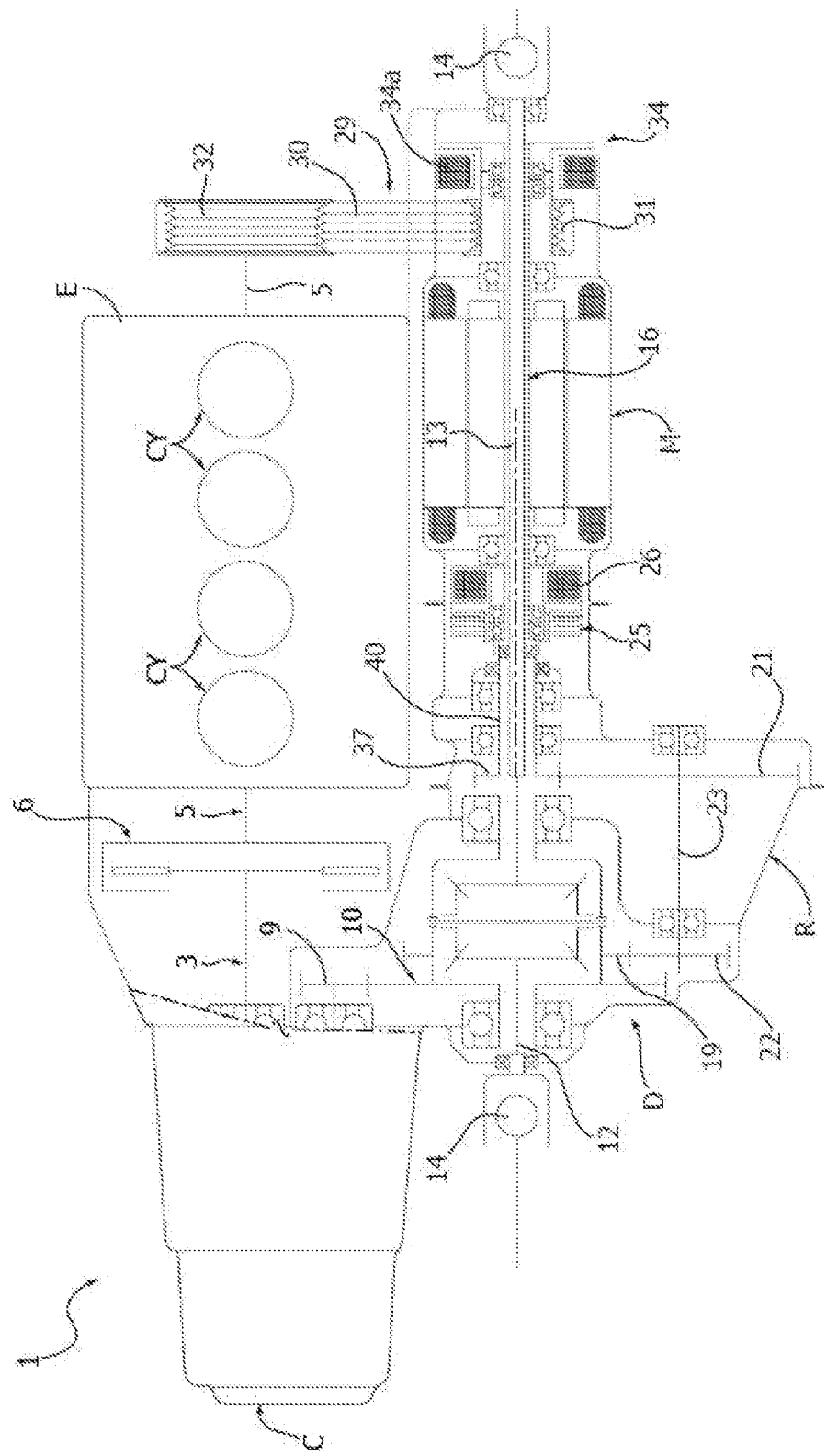

FIG. 7 shows a further variant, which does not form part of the present invention either, in so far as it does not include the belt transmission 50. In this case, the two engagement devices 25, 34 are associated to the opposite ends of the shaft of the electric machine M, as in FIG. 6. However, unlike FIG. 6, the electric machine M is mounted coaxially to the differential D, as in FIG. 1. Consequently, in the case of FIG. 7, as in FIG. 1, the shaft 16 is a hollow shaft and is traversed by the output shaft 13 of the differential. Once again in the case of the variant of FIG. 7, the transmission between the electric machine M and the differential D corresponds to the two final gear-reduction jumps of FIG. 4, with the pairs of gears 37, 21 and 22, 19 and with the gears 21, 22 directly connected together via a common shaft 23.

Figure 8:
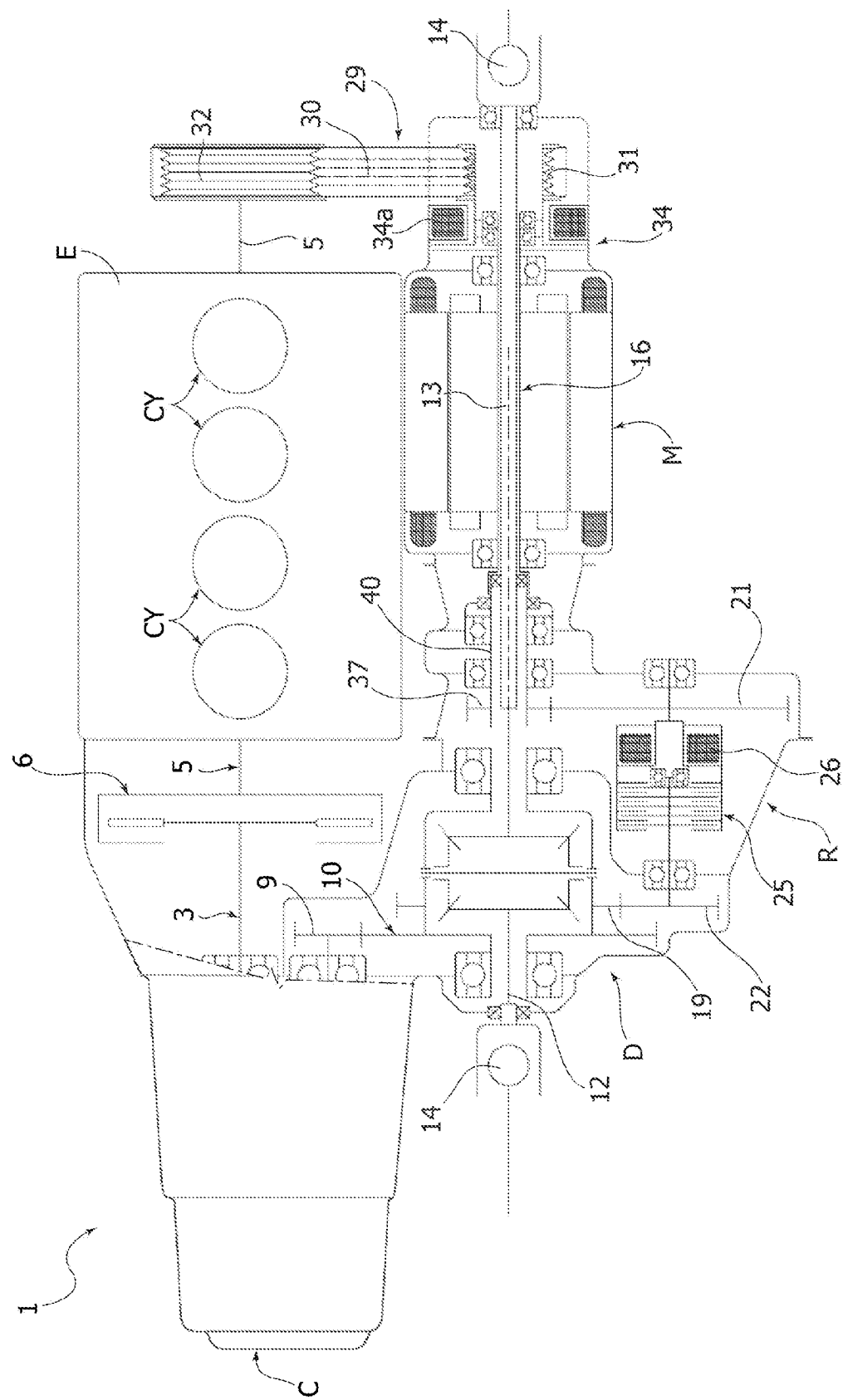

The variant of FIG. 8, which does not form part of the present invention either, in so far as it does not include the belt transmission 50, differs from that of FIG. 7 in that the engagement device 25 is arranged between the gears 21, 22.

Figure 9:
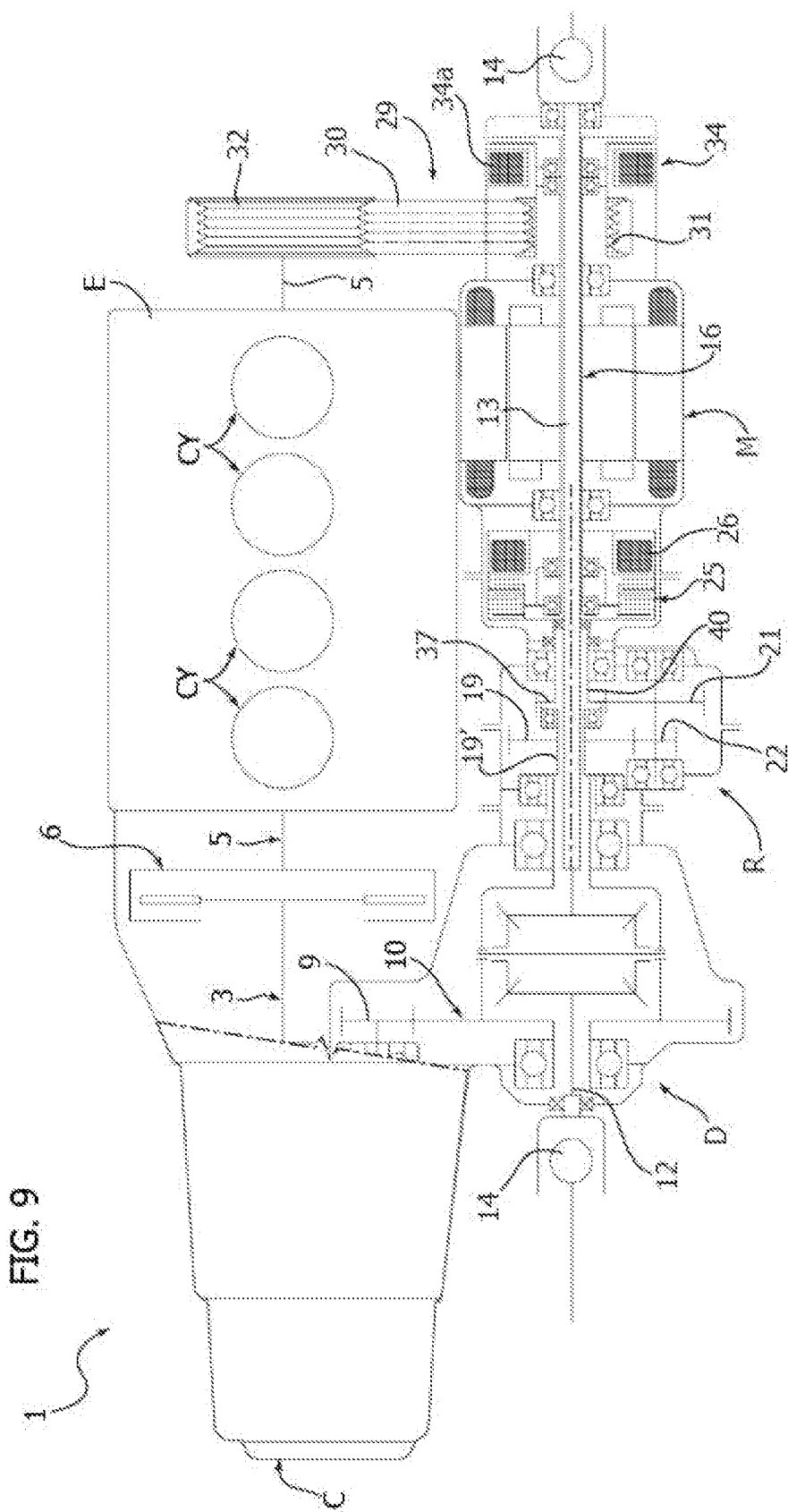

The variant of FIG. 9, which does not form part of the present invention either, in so far as it does not include the belt transmission 50, differs from that of FIG. 7 in that the second crown wheel 19 of the differential is carried by a gear connected to a hollow shaft 19', which is in turn connected to the gear-train carrier of the differential and that is arranged coaxially with respect to the shaft 13 of the differential (as in FIG. 6).

Figure 10:
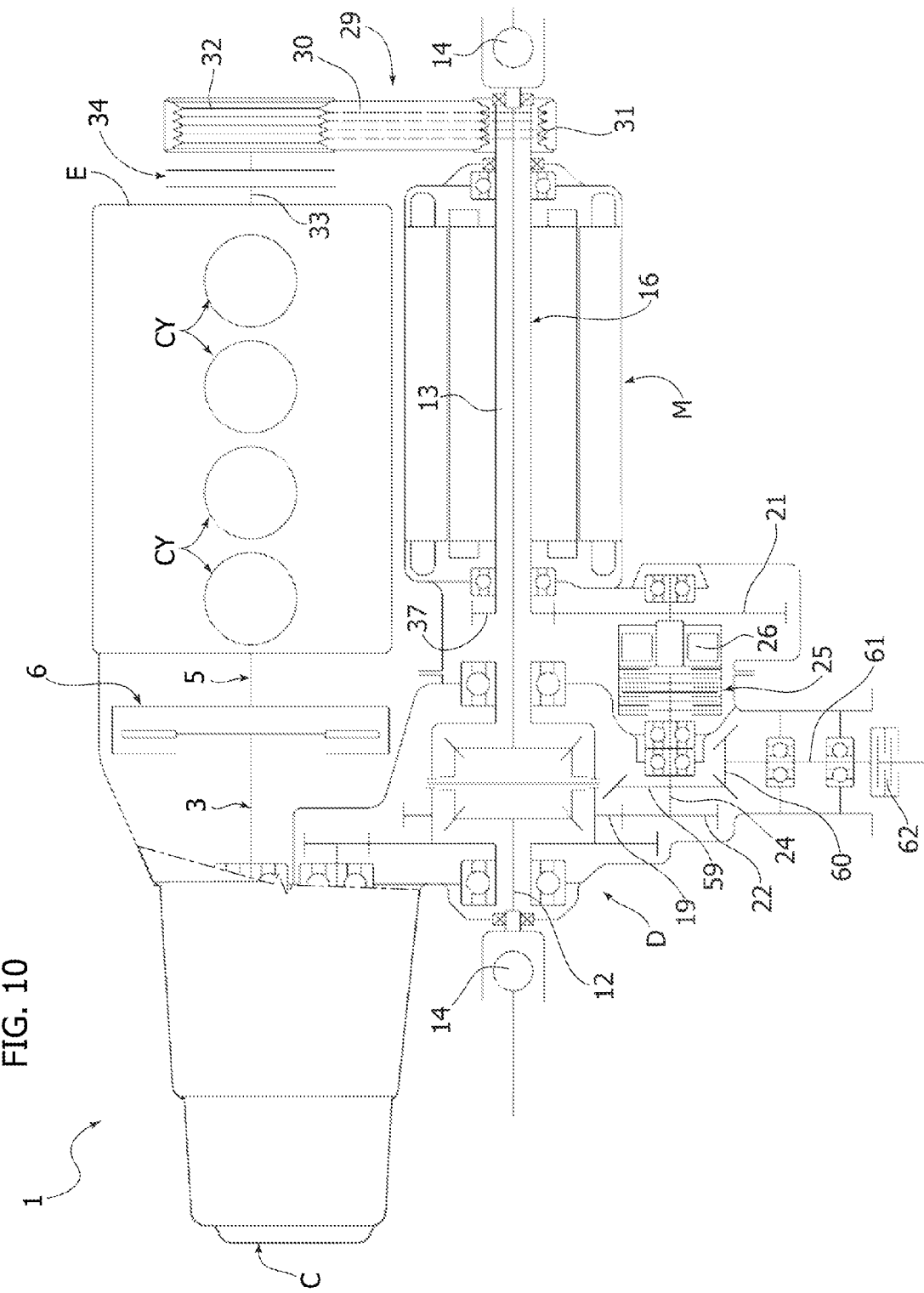
Figure 11:
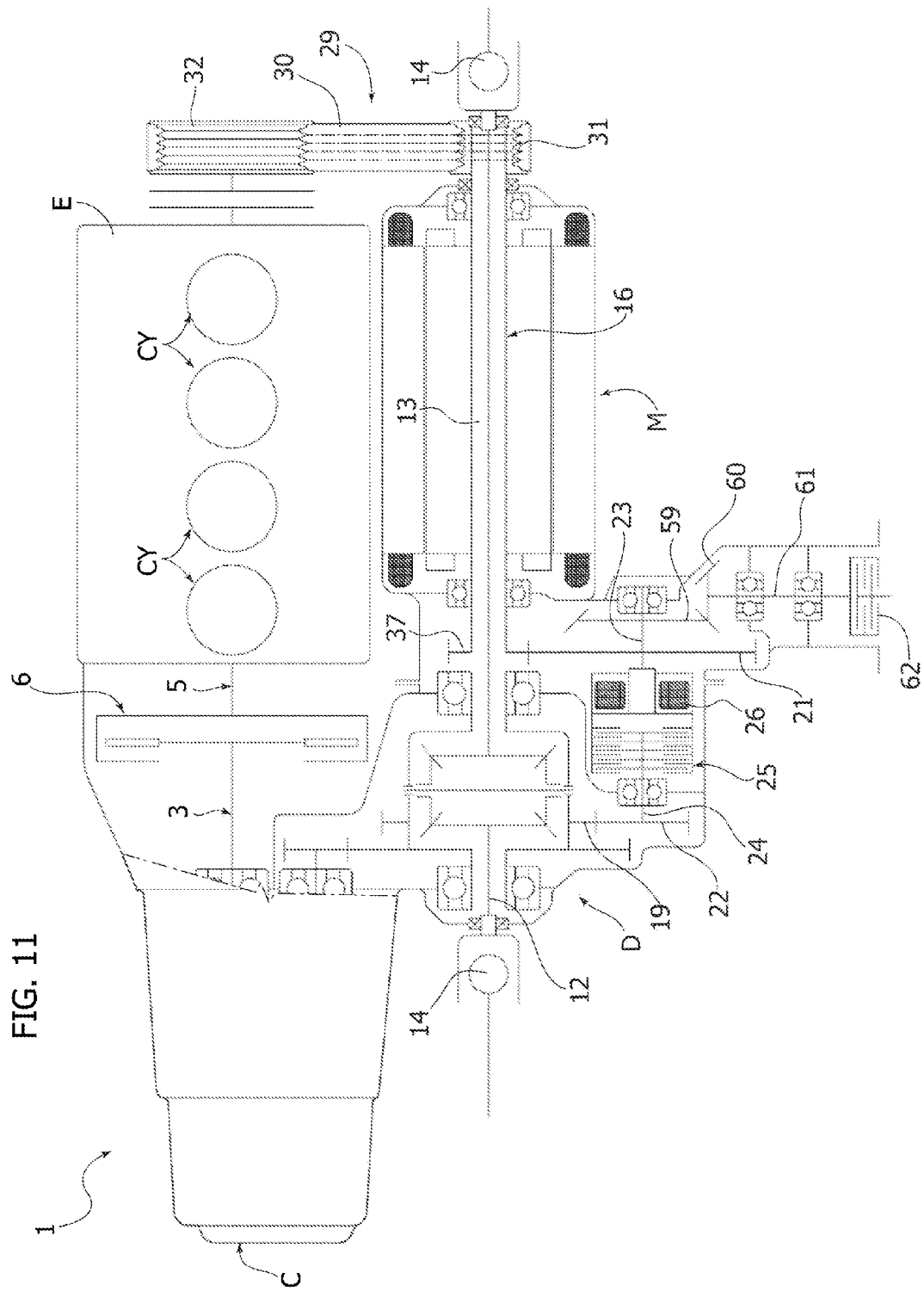

FIGS. 10 and 11 refer to applications for vehicles with four-wheel drive, in which the transmission that connects the shaft 16 of the electric machine M to the second crown wheel 19 of the differential D includes a gear for driving a transmission shaft connected to a further axle of the vehicle.

Both of the examples of FIGS. 10 and 11 refer to the case of electric an machine M arranged coaxially with respect to the shafts 12, 13 of the differential, with two gear-reduction jumps constituted by the pairs of gears 37, 21 and 22, 19 and with the engagement device 25 arranged between the two coaxial gears 21, 22.

In the case of FIG. 10, the gear for driving the transmission shaft connected to the further axle of the vehicle is a bevel gear 59, arranged, in the transmission, between the second crown wheel 19 of the differential D and the engagement device 25. The gear 59 is mounted on the shaft 24 and meshes with a bevel gear 60 having its axis orthogonal to the axis of the shaft 24. The bevel gear 60 is rigidly connected to the transmission shaft 61 that transmits power to the other axle of the vehicle, preferably via a joint 62 of any known type.

In the case of FIG. 11, the gear for driving the transmission shaft connected to the further axle of the vehicle is a bevel gear 59, arranged, in the transmission, between the engagement device 25 and the shaft 16 of the electric machine M. The gear 59 is mounted on the shaft 23 and meshes with a bevel gear 60 having its axis orthogonal to the axis of the shaft 23. The bevel gear 60 is rigidly connected to the transmission shaft 61 that transmits power to the other axle of the vehicle via a joint 62.

In the case of FIG. 10, the torque of the electric machine is shared between the front axle and the rear axle in a way identical to what occurs as regards the torque of the internal-combustion engine, whereas, in the case of FIG. 11, the functions of the electric machine are irrespective of the distribution of the torque of the internal-combustion engine, and it may even be envisaged that 100% of the torque of the internal-combustion engine is transmitted to the front axle of the motor vehicle and 100% of the torque of the electric machine is transmitted to the rear axle.

FIGS. 10 and 11 show embodiments that do not include the belt transmission 50, so that they do not fall within the scope of the present invention. However, the arrangement illustrated in FIGS. 10 and 11 of a gear 59 that transmits power to a transmission shaft 61 connected to another axle of the vehicle can be adopted also in the case of the present invention, i.e., also in combination with the belt transmission 50.

Figure 12:
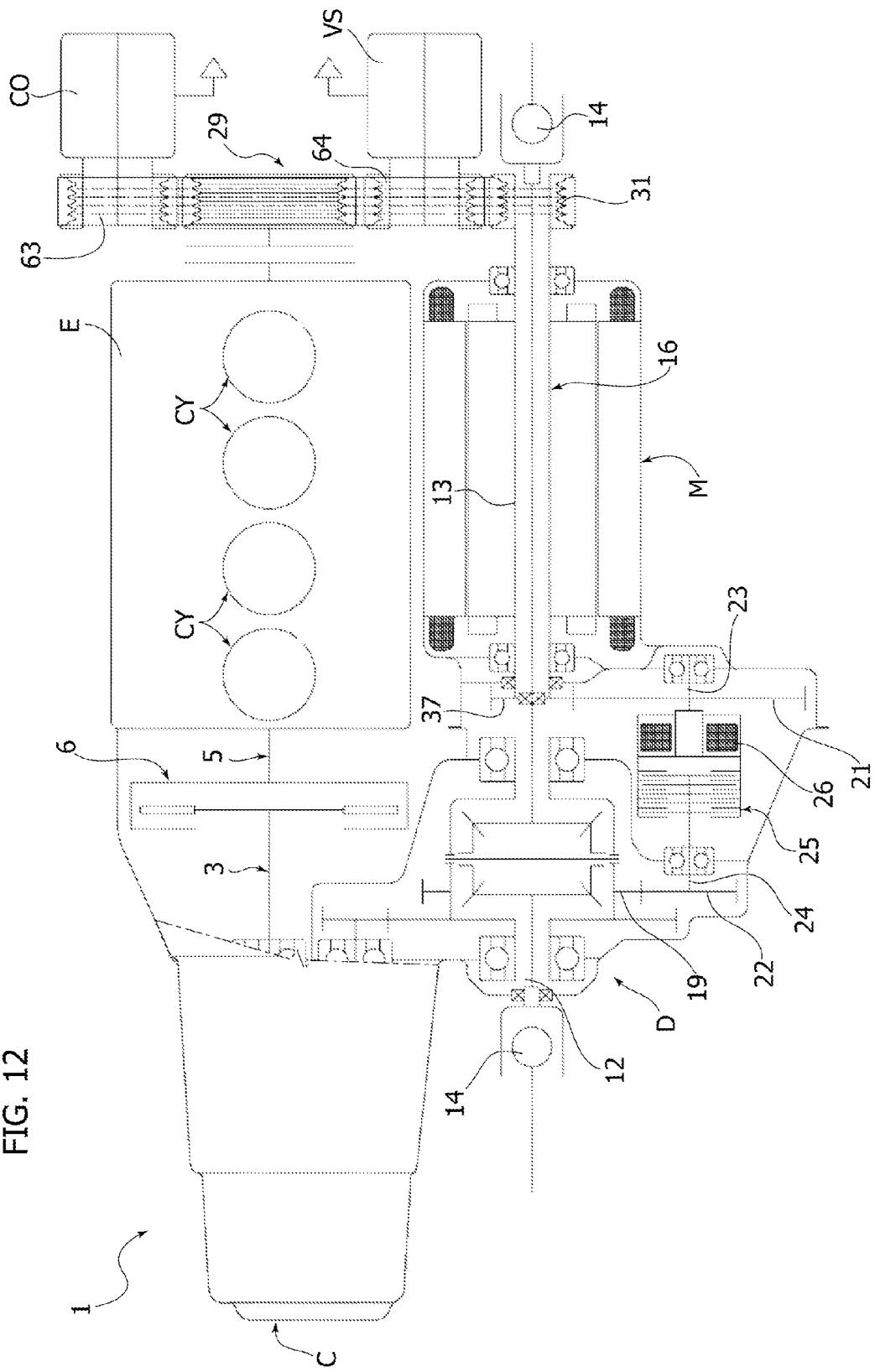
Figure 13:
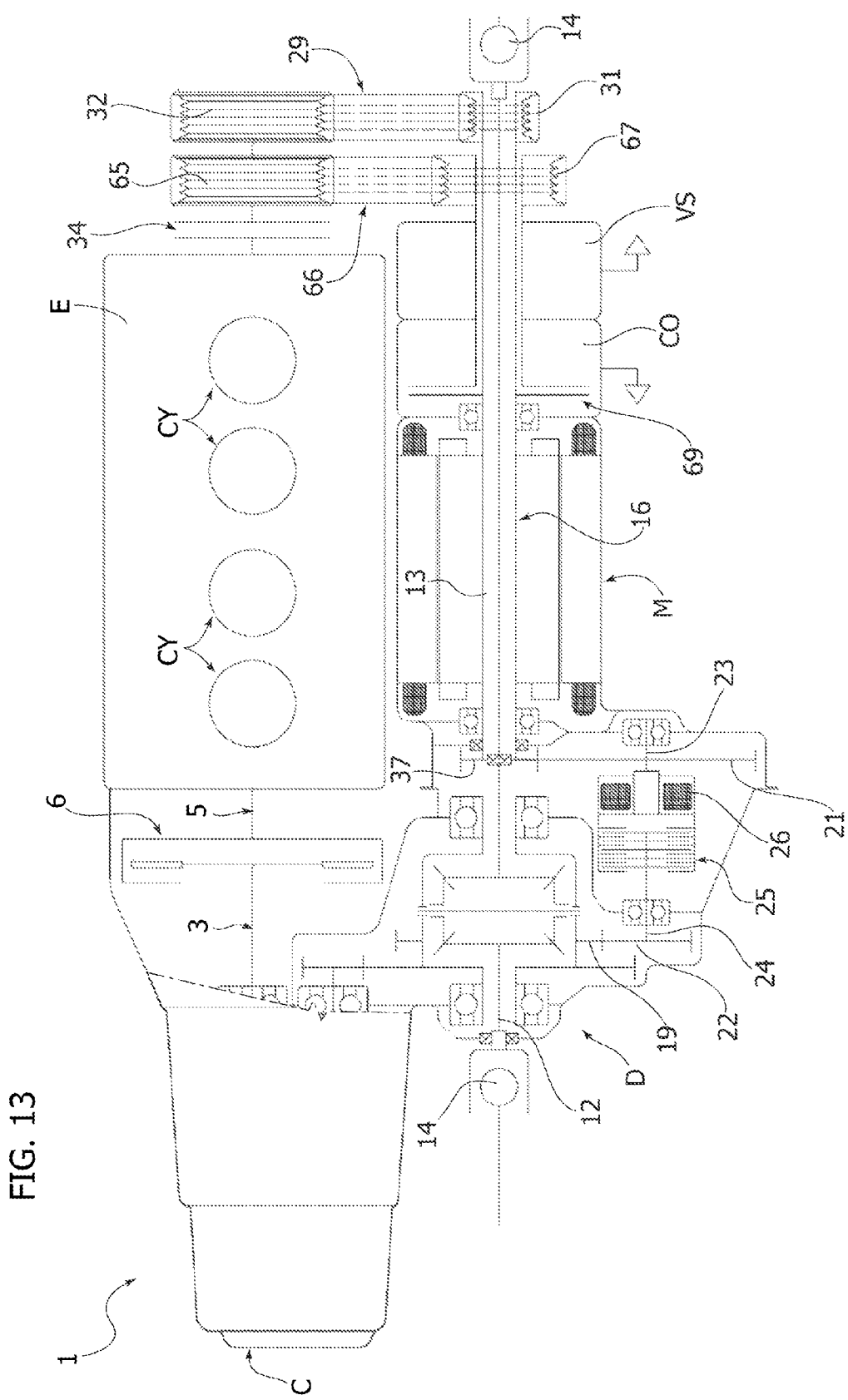

FIGS. 12 and 13 show two embodiments in which the belt transmission 29 controls also one or more auxiliary devices of the motor vehicle, such as, for example, a compressor CO of an air-conditioning system and a source of negative pressure VS for the braking system.

In the case of FIG. 12, the auxiliary belt transmission 29 is engaged on pulleys 63, 64 for actuation of said auxiliary devices.

In the case of FIG. 13, the pulley 32 of the belt transmission 29 is connected in rotation with a pulley 65 that controls, by means of a further belt transmission 66, the auxiliary devices CO and VS. The belt transmission 66 connects the pulley 65 to a pulley 67 connected to a tubular shaft 68 coaxial with the tubular shaft 16 of the electric machine (in FIGS. 10 and 11, the electric machine is coaxial with the shafts 12, 13 of the differential). The shaft 68 is connected to the shaft 16 via an engagement device 69.

The solutions of FIGS. 12 and 13 can be adopted with any arrangement of the electric machine (whether coaxial to the differential or out of line), with any arrangement of the engagement devices 25 and 34, and with any configuration of the transmission between the electric machine and the differential. In particular, the solutions of FIGS. 12 and 13 can be adopted also in the case of the present invention, i.e., also in embodiments that envisage the belt transmission 50.

Of course, without prejudice to the principle of the invention, the details of construction and the embodiments may vary widely with respect to what has been described and illustrated herein purely by way of example, without thereby departing from the scope of the present invention.

What is claimed is:

1. A hybrid powertrain unit for a motor vehicle, comprising:
    an internal-combustion engine;
    a gearbox device including:
        at least one primary shaft, that can be connected to a shaft of the internal-combustion engine by a clutch device;
        at least one secondary shaft, an axis of which is parallel to and at a distance from an axis of said at least one primary shaft and which carries an output pinion;
        a plurality of pairs of gears corresponding to a plurality of forward gear ratios, in which one of the gears of each pair of the plurality of pairs of gears is rigidly connected in rotation with respect to one of said at least one primary and secondary shafts and the other pear of each pair is freely rotatable with respect to the other of said at least one primary and secondary shafts; and
        a plurality of gear-selection devices for coupling in rotation each of said freely rotatable gears with the shaft on which it is mounted;
    a differential, having a first crown wheel meshing with said output pinion of said at least one secondary shaft of the gearbox device;
    an electric machine adapted to operate both as an electric motor and as an electric generator and having a casing rigidly connected to a supporting structure of said powertrain unit, and a shaft connected by a transmission to a second crown wheel of said differential;
    an engagement device arranged, in said transmission, between the shaft of the electric machine and the second crown wheel of the differential; and
    an actuator arrangement for actuating said engagement device;
    wherein the shaft of the electric machine is connected to the shaft of the internal-combustion engine at an end of the shaft of the engine opposite to an end of the shaft of the engine connected to the gearbox device; and
    wherein said transmission that connects the shaft of the electric machine to said second crown wheel of the differential includes at least one gear-reduction jump constituted by a belt transmission.

2. The unit according to claim 1, wherein said transmission for connection between the shaft of the electric machine and said second crown wheel of the differential includes the at least one gear-reduction jump provided by said belt transmission and at least one further gear-reduction jump provided by meshing of a gear with said second crown wheel of the differential.

3. The unit according to claim 1, wherein said transmission for connection between the shaft of the electric machine and said second crown wheel of the differential includes three gear-reduction jumps: a first of the three gear-reduction jumps provided by said belt transmission, a second of the three gear-reduction jumps provided by a first pair of gears meshing together, and a third of the three gear-reduction jumps provided by a second pair of gears meshing together, wherein one gear of the second pair of gears meshing together includes the second crown wheel.

4. The unit according to claim 3, wherein:
    the shaft of the electric machine has an axis parallel to and arranged at a distance from axes of two output shafts of the differential;
    said belt transmission that provides the first gear-reduction jump connects a first pulley, rigidly connected to the shaft of the electric machine, to a second pulley, rigidly connected to a hollow shaft, the hollow shaft being mounted coaxially with respect to the two output shafts of the differential and the hollow shaft being axially traversed by one of said output shafts of the differential;
    the first pair of gears meshing together provides the second gear-reduction jump of the three gear reduction jumps and includes a first input gear, rigidly connected to said hollow shaft, and a first output gear;
    the second pair of gears meshing together provides the third gear-reduction jump of the three gear reduction jumps and comprises a second input gear and a second output gear constituted by said second crown wheel of the differential; and
    the first output gear of the second gear-reduction jump and the second input gear of the third gear-reduction jump are coaxial and connected together.

5. The unit according to claim 4, wherein the first output gear of the second gear-reduction jump and the second input gear of the third gear-reduction jump are connected in rotation with two shafts, which are aligned to one another and can be connected by said engagement device.

6. The unit according to claim 4, wherein the first output gear of the second gear-reduction jump and the second input gear of the third gear-reduction jump are connected in rotation to one another via a same shaft.

7. The unit according to claim 6, wherein said engagement device is arranged between said belt transmission and the shaft of said electric machine.

8. The unit according to claim 1, wherein said engagement device is a clutch engagement device, and the actuator arrangement comprises an electromagnetic or electrohydraulic actuator and an electronic unit for control of said actuator.

9. The unit according to claim 1, wherein the shaft of the electric machine is connected to the shaft of the internal-combustion engine by an auxiliary belt transmission including an endless belt engaged on a first pulley and on a second pulley, the first pulley being connected to the shaft of the electric machine, and the second pulley being connected to the shaft of the internal-combustion engine.

10. The unit according to claim 9, wherein arranged between one of said first and second pulleys of said auxiliary belt transmission and the respective electric machine shaft or internal-combustion engine shaft is a further engagement device.

11. The unit according to claim 10, wherein said further engagement device is arranged between the shaft of the internal-combustion engine and said second pulley.

12. The unit according to claim 10, wherein said further engagement device is arranged between the shaft of the electric machine and said first pulley.

\* \* \* \* \*